United States Patent
Reynolds (10) Patent No.: US 12,481,991 B2
(45) Date of Patent: Nov. 25, 2025

(54) PHYSICAL, VIRTUAL, RECONCILIATION INFORMATION TRANSMISSION DEVICE AND SYSTEM

(71) Applicant: Steven J Reynolds, Chicago, IL (US)

(72) Inventor: Steven J Reynolds, Chicago, IL (US)

( * ) Notice: Subject to any disclaimer, the term of this patent is extended or adjusted under 35 U.S.C. 154(b) by 325 days.

(21) Appl. No.: 17/724,684

(22) Filed: Apr. 20, 2022

(65) Prior Publication Data

US 2023/0342769 A1    Oct. 26, 2023

(51) Int. Cl.
| | | |
|---|---|---|
| *H04L 29/00* | (2006.01) | |
| *G06Q 20/02* | (2012.01) | |
| *G06Q 20/40* | (2012.01) | |
| *H04L 9/40* | (2022.01) | |
| *H04L 67/306* | (2022.01) | |

(52) U.S. Cl.
CPC ............. *G06Q 20/40* (2013.01); *G06Q 20/02* (2013.01); *H04L 63/1425* (2013.01); *H04L 67/306* (2013.01)

(58) Field of Classification Search
CPC .... G06Q 20/40; G06Q 20/02; H04L 63/1425; H04L 67/306; H04L 63/08
See application file for complete search history.

(56) References Cited

U.S. PATENT DOCUMENTS

| | | | |
|---|---|---|---|
| 10,063,579 B1* | 8/2018 | Machani | H04L 67/535 |
| 2015/0037781 A1* | 2/2015 | Breed | G09B 7/00 |
| | | | 434/362 |
| 2019/0066424 A1* | 2/2019 | Hassani | B60R 25/252 |
| 2021/0064726 A1* | 3/2021 | Mannby | H04L 63/0861 |

\* cited by examiner

*Primary Examiner* — Jeffrey C Pwu
*Assistant Examiner* — Helai Salehi
(74) *Attorney, Agent, or Firm* — Global IP Counselors, LLP (57) ABSTRACT

A physical, virtual reconciliation ("PVR") system senses physical information about an individual user and uses that information to create, modify, or secure a virtual presence of the user. In one embodiment, the PVR system includes at least one physical device kept by the user (e.g., either at home or on the user's person) and configured to transmit a stream of substantially dynamic user variable values, at least one physical device kept by the user and configured to transmit substantially static user values, and a PVR server running software to analyze the values. In one embodiment, the PVR system provides for, among other things, reconciliation of an individual's physical presence with their virtual presence in a manner that ensures a security, including preventing the virtual presence from being appropriated, and control of the transmission of information about the user to third-parties.

23 Claims, 5 Drawing Sheets

PHYSICAL, VIRTUAL, RECONCILIATION INFORMATION TRANSMISSION DEVICE AND SYSTEM

BACKGROUND OF THE INVENTION

The present invention relates to a physical, virtual reconciliation ("PVR") device or system that senses physical information about an individual user and uses that information to create, modify, or secure a virtual presence of the user (e.g., a user profile).

BRIEF SUMMARY OF THE INVENTION

One or more of the embodiments of the present invention provide a PVR device or system that translates physical information about an individual to an online, virtual presence. Multiple embodiments are described, but they are not meant to be exclusive. Given the flexibility to configure the PVR device or system, most aspects of the various embodiments are interchangeable or able to be combined, even if the device or system is configured to operate in a different manner at different times or under different conditions.

In one embodiment, the PVR device or system connects to (or includes) at least two sensors that are kept by the user (e.g., either at home or on the user's person) and that communicate with a PVR server running software to analyze values provided by the sensors.

The PVR device or system also provides for, among other things, reconciliation of an individual's physical presence with their virtual presence in a manner that ensures security, including preventing the virtual presence from being coopted.

The following definitions apply to this specification and the claims:

The word "or" will be interpreted as inclusive and not limiting, unless the context makes expressly clear that it should be limiting.

The terms "person" or "party" are used interchangeably to mean a person or entity.

The terms "individual" and "user" used interchangeably to mean a physical person. In the context of electronic systems, the terms "individual" and "user" extend to data that identifies or authenticates such individual or user.

A "network" means a system of two or more devices (e.g., computers or peripherals) that are arranged to communicate with one another other. When networks are referenced separately it will be understood that the networks could be separate networks or also the same network (e.g., referencing different communications at different times over the same network or communications following different paths over one or more networks).

A "remote network" means a network over which two or more devices are arranged to communicate from one physical location (such as a room, building, or property) to another physical location.

A "sensor" means an instrument or other device capable of sampling, measuring, or detecting a physical input or signal.

To "sense" means the act of sampling, measuring, or detecting a physical input or signal.

A "setting" is a criterion, value, choice, or other input from a user that controls how a device operates or controls the logic used in processing data; such as, for example, whether or how to transmit data in response to queries.

A user "profile" is a collection of information that describes a physical individual. It may include information related to devices used by the user (e.g., mac address or serial number) but must also include at least some information related to an actual, physical individual (e.g., physical description of the individual, description of the individual's interests, post the individual means to publish or distribute, the individual's preferred activities, description of what the individual is doing or thinking, or any other type of information used by individuals to present or describe themselves electronically, which they sometimes do via social media). A user's profile can be an important part, or it can serve as, a user's virtual presence.

A "variable" is a phenomenon, or physical input or signal, that a sensor can sense or detect. Some examples of variables include heart rate (or rhythm), facial features, retinal or other eye patterns or colors, temperature, typing patterns, voice patterns, images, audio, and many others. A user variable is a variable that can be detected by examining, or training a sensor on, a user.

The terms "value" and "datum" are used interchangeably to mean a discrete set of information or values. When used in connection with sensors, the terms "value" and "datum" relate to the physical input or signal sensed by a sensor, regardless of the format of the value or datum. Sensors may detect incoming signals in several ways or store the results in different forms. For example, a sensor value may be the raw data stored by the sensor, or it may be data processed into different formats or values, or decoded or encoded, including, but not limited to, in any analog or digital format or unit.

A "substantially static user variable" or "SSV" is a variable that is generally constant over time, that can be used to identify an individual to a resolution of at least one in a million worldwide, and that retains such distinguishing characteristic over time. One example of an SSV is a DNA short tandem repeat, but an SSV can also be any characteristic of DNA that provides the required precision. An individual's DNA (e.g., sequences, lengths of repeated regions, or other measurables or characteristics) are generally constant, absent local mutations. DNA can distinguish users to even greater precision than one-in-a-million worldwide, even if, for example, identical twins share the same DNA. Other examples of SSVs could be biomarkers such as iris patterns, retinal patterns, fingerprints, or other biometric patterns. Even if such patterns change slightly, they do not lose their identifying character over time.

A "substantially dynamic user variable" or "SDV" is a variable that is not generally constant over time and that can be analyzed for anomalies based upon how it changes. Two examples of SDVs are heart rate or heart rhythm. Another example is the color of shirt an individual is wearing on a given day. Another example is the location of an individual at a given moment.

An "anomaly" is a pattern, outlier, or other deviation that differs from a normal or expected pattern, value, or other change.

A "user-exception anomaly" is an anomaly that indicates that an individual is not authenticated; such as, for example, when an unauthorized user (e.g., a would-be hacker) begins transmitting, or causes to be transmitted, SDV values to the authenticated user's virtual profile.

To "disregard" information, values, or data means to reject, delete, quarantine, or otherwise process such information, value, or data in a way that such information, value, or data does not alter or affect other information, values, or data (e.g., other non-anomalous data).

One embodiment of the present invention uses a senor to sense an SSV directly from an individual user. This provides for a physical touchpoint that precisely and reliably identifies the user by using the user's physical characteristics. The sensor transmits SSV values to the PVR server. The PVR server uses the SSV to link a the individual to a virtual presence and to reauthenticate the user, when needed. In one embodiment, the virtual presence includes a user profile.

In one embodiment, one or more SDVs serve at least two purposes. First, they are used as a quicker and less resource-intensive means (when compared to use of SSVs for authentication) for determining whether the correct individual (i.e., authenticated user) is interacting with the PVR server. Second, SDVs are used to allow third-parties to obtain information about the user that may change over time. This allows third-parties to learn about the user and also allows third-parties to confirm the identity of the user. Such identity confirmation can be done, for example, by the third-party submitting information the third-party perceives about the user to the PVR server and obtaining confirmation from the PVR server that such information matches the information the PVR server received as SDV values. The PVR server may also provide notice feedback to the user that such confirmation transaction took place. Additionally, the PVR server may be used as a replacement for a user's social media presence, because it can control content posted by a user while maintaining a secure, authenticated link to the user at all times.

In another embodiment, the transmission of values of one or more SDVs occurs automatically and provides the PVR server a data stream, which preferably serves as a substantially regular or continuous, and substantially real-time, indication that the correct user is communicating with the PVR server ("RI-Signal"). In this case, there is no one-size-fits-all approach. For example, the RI-Signal may be set to be actively transmitted at certain times. At other times it may be paused or reduced (e.g., the sample or transmission rate slowed substantially) during periods of time when the user is resting (e.g., at home or during the evening) or during periods of time when a sensor is being charged. One of skill in the art will understand how to configure data sampling and transmission rates to create a substantially regular or continuous, and substantially real-time, indication that is appropriate under given circumstances or intended uses. One good metric is to consider whether such a data stream will be continuous enough that would-be human hackers would not have a reasonably sufficient amount of time to appropriate the applicable SDV sensor from the authenticated user (and to apply it to themselves) without an identifiable interrupt in the data flow. For example, SDV values may be sampled at a rate of twice per second, and data packets may be transmitted at a rate of one per second. The SDV data stream (of values) serves as a running authentication process or as a type of authentication "heartbeat" demonstrating that user authentication is maintained. One example of a benefit of such RI signal—especially when compared to traditional authentication methods—is that traditional methods cannot be applied in real-time. For example, asking a user to input a login and password every minute would not be feasible or pleasant. Nor would requiring some type of two- or multi-factor reauthentication on a regular basis throughout the day. Such methods can create problems, because hackers often use the time periods between authentication events to appropriate credentials or develop means of breaking into systems. Using a relatively constant transmission of SDV values, such as an RI-Signal, ensures that no sufficient break in time occurs in which a would-be hacker could attempt to coopt a user's authentication. Another benefit is that SDV values change. Thus, a would-be hacker cannot appropriate a user's identity by learning just one piece (or set) of information (e.g., login and password). The would-be hacker would have to replicate the RI-Signal stream, which would be almost impossible without using sensors to takes samples from the correct user.

If a user-exception anomaly occurs in the RI-Signal, the PVR server responds by disregarding SDV data received at the server until such point in time that the user is reauthenticated using the SSV sensor. In one embodiment, along with, or as part of, the reauthentication process, the user may confirm that some or all of the data determined to be anomalous was not in fact anomalous, or correct that data; at which point the PVR system would incorporate such data by ceasing to disregard it. In some instances, the reauthentication process might have occurred in response to a major change in the constitution of the authorized user such that the PVR system may have to reinitiate or recalibrate its process of analyzing data for anomalies in response to the change. In other instances, the user may trigger (or schedule) reauthentication or re-training in anticipation of an expected change. If a major change were to occur in a user's SSV, an in-depth, substantial, and reliable means of reauthentication would likely be required—given the general reliance on SSVs remaining constant. Such instances would be very rare (especially compared to any major change in SDVs); thus, requiring an in-depth, substantial, and reliable means of reauthentication would not be unduly burdensome in the larger scope of use of the device or system.

In general, it will be understood that the pairing of a precise and reliable (but more complex or intrusive) authentication method (using SSVs) along with a quicker and more efficient authentication method (using SDVs) allows for (1) robust security over long periods of time and (2) an efficient means of user-verification in roughly real-time.

DETAILED DESCRIPTION OF THE INVENTION

Figure 1:
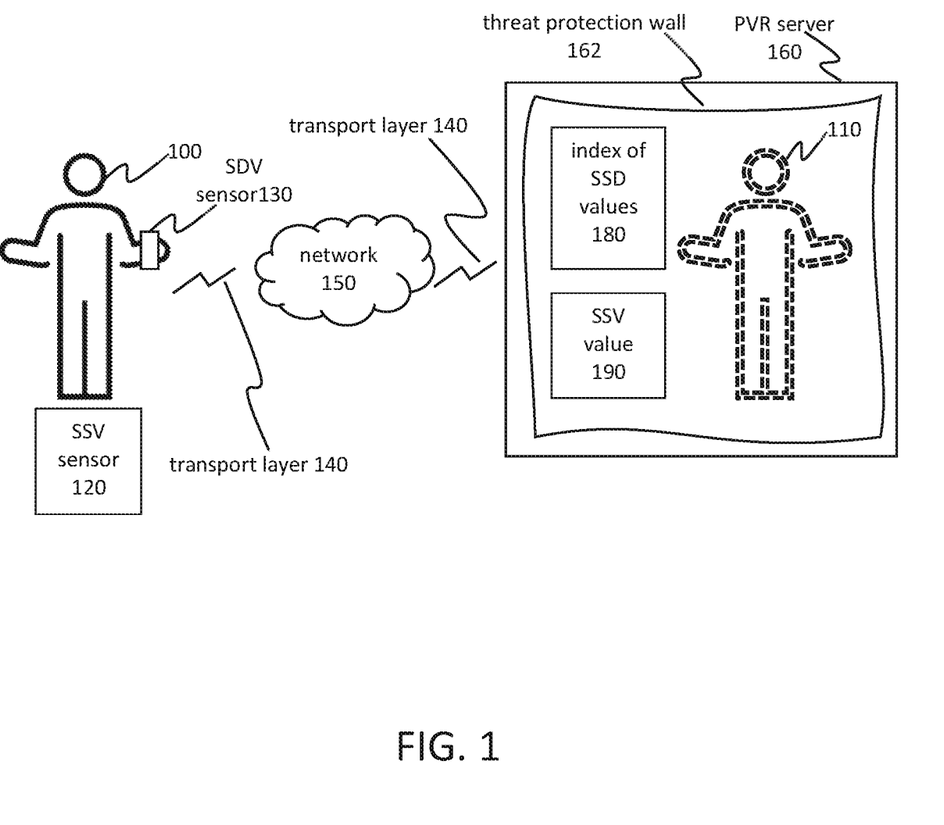
FIG. 1 illustrates one embodiment of the PVR device or system in which the PVR server is connected to both an SSV sensor and an SDV sensor over a network.

FIG. 1 illustrates one embodiment of the PVR device or system in which the PVR server 160 is a computing device or program (such as a server, collection of servers, or cloud-based platform) and is connected to both an SSV sensor 120 and an SDV sensor 130 via one or more transport layers 140 (which are preferably secure or encrypted when sensitive information is being exchanged) over a network 150 (which could be a remote network like the internet or any combination of connected networks). The transport layer could be a single transport layer, separate layers, integrated layers, or any other means of transmitting electronic information in the field of computing and networking. The server 160 can be configured to cause the sensors to alter their performance, such as, for example, by causing the sensors to adjust sampling rates or transmission rates.

It will be understood that data collected by a physical sensor may be transmitted directly to a server or cloud-based platform. Data could also be collected by a physical sensor and transmitted via a mobile communication device application to a server or platform. Any part of the data transmission process could be encrypted or otherwise secured using known means.

In one embodiment, the PVR server is configured to receive an SDV value either directly or indirectly and over at least one remote network. Of course, local networks may also be used (e.g., connected through or to a remote network). The use of a remote network provides for, as an example, transmission of SDV values when a user is not located in the same physical location as the server. A reliable and continuous connection is helpful to maintain a stream of SDV values. SSV values, by comparison, do not require such continuity and thus do not have the same need to be transmitted over a remote network. That said, they very much could be transmitted over a remote network to a remote server.

The SDV sensor and SSV sensor are each positioned to take samples of the user 100, but do not have to be positioned together. For example, the SDV sensor could be affixed to the user, and the SSV sensor could be stored in the user's residence. The PVR server can be protected by a threat protection wall 162 (e.g., a firewall, encryption, or other threat detection and monitoring system) and can store an index of SSD values 180 in memory and stores at least one SSV value 190 in memory.

Numerous SSV sensors are known. Even if some are large, expensive, or cumbersome, they are becoming smaller, less expensive, and simpler as time progresses. Examples include biometric input devices such as fingerprint scanners, handprint scanners, iris scanners, facial scanners, audio voice recorders, DNA sampling devices, and other measuring or sampling devices. In addition, commercially available conversion software exists that converts such inputs (e.g., a scanned fingerprint) into unique, repeatable numerical or alphanumerical strings or numbers that can be used as biometric keys or other identifiers.

Further, numerous methods and devices for conducting authentication of an individual are known, including, but not limited to, general and specific methods—some of which were discussed above. Such means range in terms of complexity, robustness, reliability, and intrusiveness. It will be understood that different embodiments can make use of any number of different types of authentication means. Different types can be employed at different times or under different circumstances, as appropriate. In one embodiment, the PVR device or system chooses the method based upon such factors as, for example, the magnitude or length of a detected user-exception anomaly, whether or if other levels of authentication have previously failed to provide reliable results, other indicia of threat level, or other indicia of the level of security or precision required in a given setting.

In one embodiment, an SSV value is locked (e.g., by encryption) into a physical device that contains the SSV sensor 120. Such lock provides electronic security. Additionally, a user can provide physical security by locking the SSV sensor in the user's home, office, or other secured location. Such electronic or physical protections—especially when used in combination—make a cyber-attack difficult or impossible. In one embodiment, the SSV sensor (or the device containing it) can be configured to cause the virtual presence (stored on the server) to be locked (or frozen or otherwise quarantined) at all times when the user is not authenticated (e.g., until the user is reauthenticated using the SSV sensor).

In another embodiment, the link between the SSV sensor and the PVR server is established using an encrypted public/private key set known only to the two devices. Alternatively, other known secure or impenetrable communication links can also be used (e.g., a Diffie-Hellman key exchange).

A virtual presence can be confirmed or recovered using any necessary level of authentication. If necessary, a neutral third-party can participate. The authentication process can include any number of known methods, including, if necessary, an in-person visit for professional confirmation of identity (e.g., with a doctor measuring vitals), virtual discussion with a notary or other professional, or other method or combination of methods. The instances in which a user must be authenticated using SSV values (or via other intensive or complex process) should occur significantly less often than the instances in which a user transmits SDV values. Thus, even the use of respectively intensive or time-consuming authentication processes will not prove unduly disruptive to the overall scheme and use of the PVR system. That said, no device or system operates perfectly all the time.

SDV sensors are also well known. Just a few examples include vital sensors (sensing, e.g., heart rate, heart rhythm, temperature, blood glucose levels), some of which are wearable or attached to an individual such that they can automatically take samples. Other examples include pattern detection devices, ambient temperature sensors, image sensors, motion sensors, physical input devices, or any other sensors capable of measuring a variable that describes, identifies, or otherwise relates to an individual. Many known SDV sensors are capable of sampling at rates faster than once per minute (e.g., 5 Hz, 32 Hz, 150 Hz, etc.).

The PVR system or device can make use of multiple variables covering different dimensions or phenomena (e.g., more than one vital sign as well as location as well as ad hoc information input by a user). Use of multiple variables will allow different transaction parties to query different SDVs (e.g., face versus physical location versus spending pattern versus clothes worn on a given day and so on).

Additionally, the PVR system or device can be adapted so that the sample rate of SDV sensors is some multiple of the expected average sample rate of an SSV sensor (or of the expected average transmission rate of SSV values from the SSV sensor to the PVR Server). For example, in one embodiment, the sample rate of SDV sensors is set to be at least 100 times the expected sample rate of the SSV sensor. The purpose of adjusting the relative rates of sampling (or transmission) of SDV versus SSV values is to ensure that the convenience and efficiency of tracking and analyzing SDV values is not interrupted too often by the need to track or analyze of SSV values. Thus, for example, if a certain system is expected to (or does) operate with low rates of user-exception anomaly occurrences, the SDV sensor sample (or transmission) rate could be decreased in view of the decreased use of SSV values. Conversely, if a certain system is expected to (or does) operate with high rates of user-exception anomaly occurrences, the SSDV sensor sample (or transmission) rate could be increased to provide additional fidelity. One of the goals of such adjustments could be to tailor the PVR system or device so that in operation, in the setting in which it is expected to be used, it relies on analyses of SDV values at a substantially greater rate than it relies on authentication by SSV values.

Figure 2:
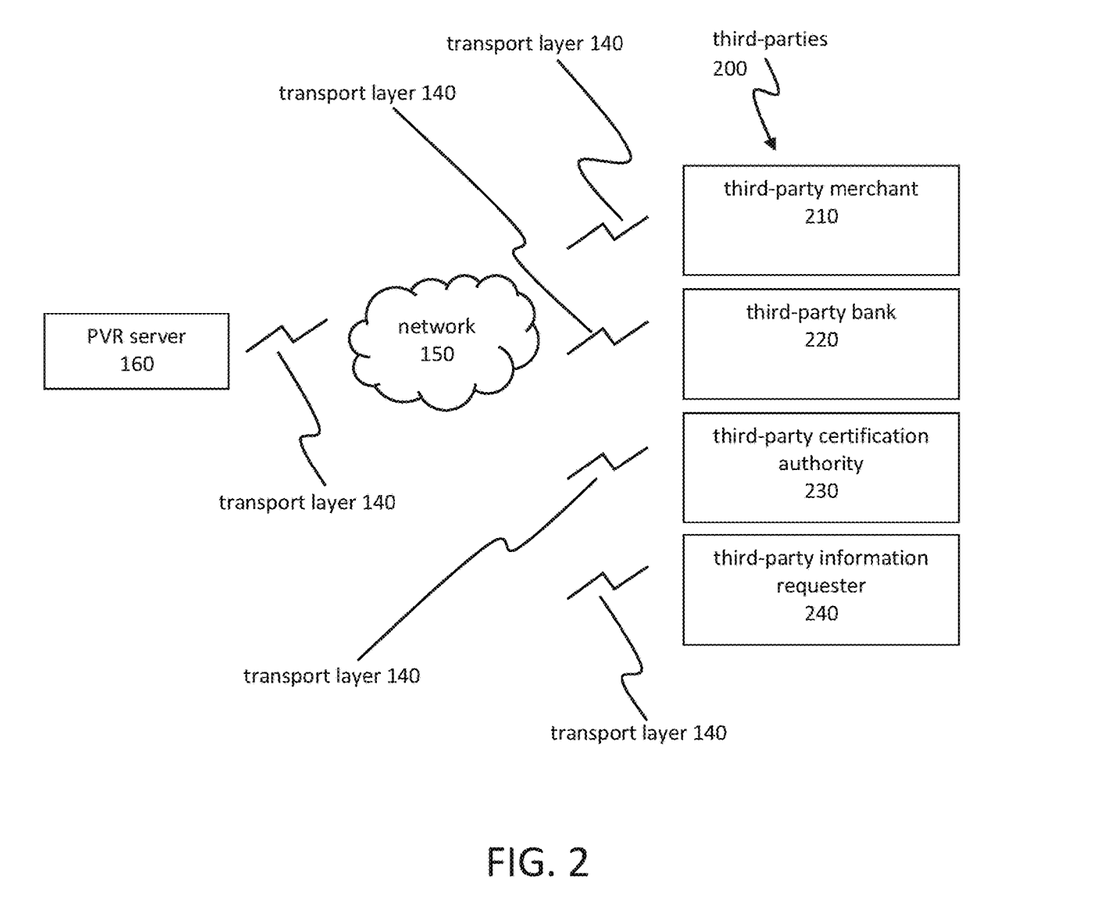
FIG. 2 illustrates a high-level communication structure in which the PVR server communicates with a number of third-parties.

FIG. 2 illustrates a high-level communication structure in which the PVR server 160 communicates with a number of third-parties 200. Four third-parties are shown but, in practice, the PVR server could communicate with any number of third-parties. The non-limiting set of categories of third-parties are shown to be the following: a third-party merchant 210, a third-party bank 220, a third-party certification authority 230 (some common examples being Verisign or GlobalSign or any other neutral body), and a third-party information requester 240. The certification authority can be any person, entity, or other process (e.g., smart contract or use of a block chain ledger) that can be used to confirm the identity of an individual or user. Note that information requests need not be secure in all aspects. For example, third-party 240 could be an individual seeking to learn information about the user 100; it could even represent any person in the public at large. Such individual may request non-sensitive information, such as, for example, the user's work location or job title, user's preferences, or information the user seeks to publishes freely. Since the foregoing is the type of information a user would generally distribute (e.g., via business cards or on social or professional media), the PVR settings may be set to respond to such queries or responses without an encrypted communication. The information could even be published online via the PVR server or via another outlet, including allowed to be accessible via an application programming interface.

Additionally, the PVR server can be set to provide feedback to the authenticated user related to third-party communications. Thus, for example, if the user is in the presence of a third-party, the user might be notified that the third-party has requested information from the PVR server and might provide personal confirmation to the third-party that the information is correct or that a transaction may proceed.

Figure 3:
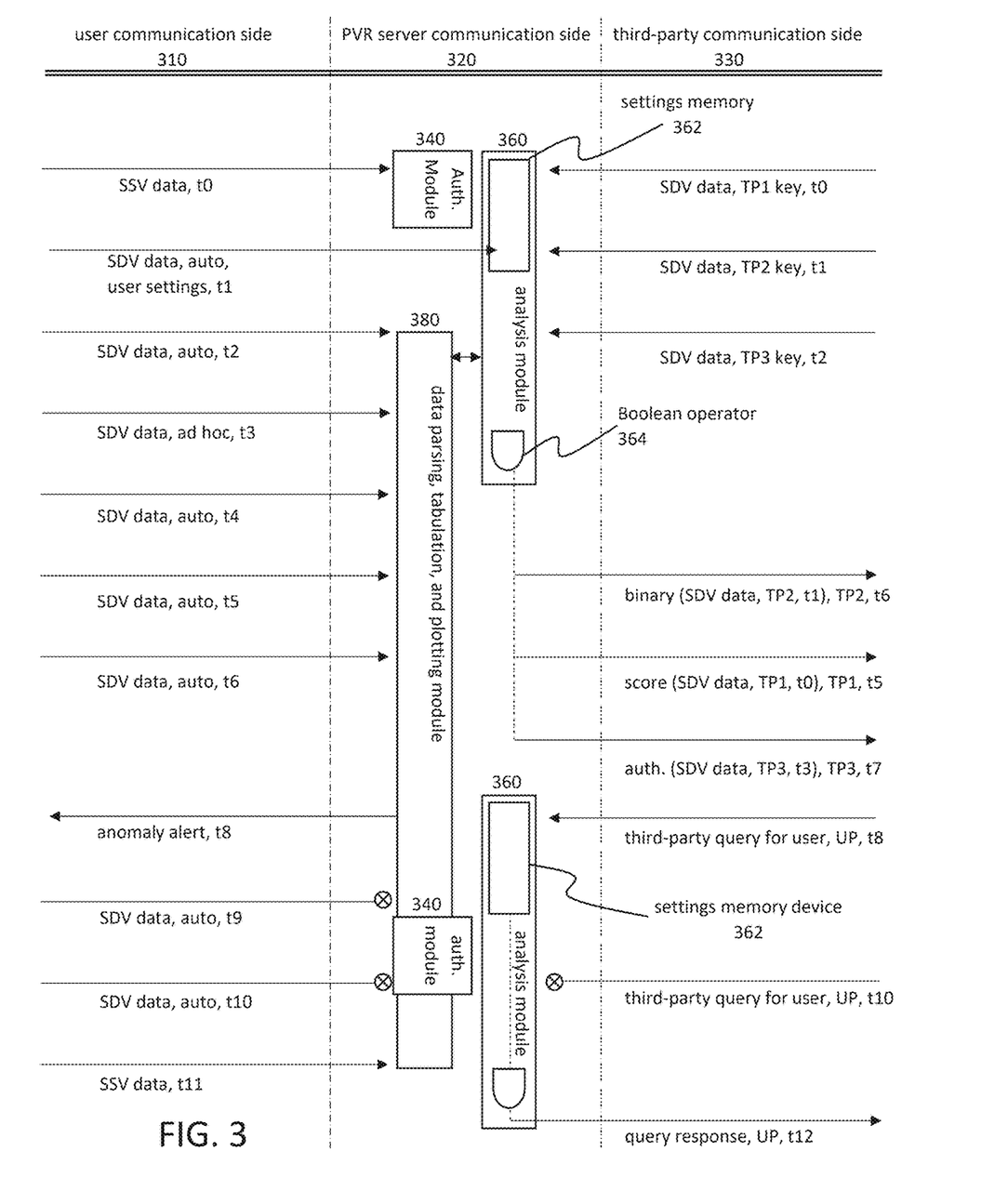
FIG. 3 provides an example of a set of communication, authentication, analysis, and query activities in connection with the PVR server.

FIG. 3 illustrates an example of a set of communication, authentication, analysis, and query activities in connection with the PVR server 160. The communication structure shown in FIG. 3 includes a user communication side 310, PVR server communication side 320, and third-party communication side 330. The third-party communication side is shown in FIG. 3 with four parties: third-party 1 (TP1), third-party 2 (TP2), third-party 3 (TP3), and unknown querying party (UP). Transmission of SSV values and SDV values from the user communication side to the PVR server is shown on the left. Communications to and from third-parties is shown on the right. Each communication takes place at a time (t), which begins at t0 (t=0).

In the configuration shown, the PVR server includes an authentication module (auth. module 340), analysis module 360 (which includes a settings memory device 362 and a Boolean operator 364), and data parsing, tabulation, and plotting module 380 ("Data Module"). The foregoing components can be connected electrically or logically in the PVR server or distributed over one or more servers. They may also come in the form of separate modules or layers of a software stack or in the form of any other communicative or logical relationship known in the art. It should be noted that FIG. 3 is a graphical representation for demonstrative purposes. As such, some components are shown twice (e.g., 340 and 360) simply to demonstrate operation at separate points in time (as the time progress from t0 forward).

Following the temporal path in FIG. 3: SSV data is sent at t0, demonstrating that the user has used the SSV sensor to authenticate themself. Now that the user has been authenticated, the PVR server will accept a stream of SDV values and any ad hoc information transmitted at approximately the same time the server receives the SDV data. In this sense, "approximately the same time" means in a manner that reliably indicates that the same user sent both the ad hoc data and the SDV data. For example, if ad hoc data is sent within a few seconds of an SDV value, determining whether the SDV value is anomalous or not may serve as a good indication of whether the ad hoc data is anomalous or not. Whether the "approximately the same time" condition is met can be determined based upon any number of factors such, as, for example: whether the data are packaged together, whether the same device sent both sets of data (e.g., by mac address), or how voluminous or complex the data are. One of skill in the art will understand how such factors—considered in the context of the particular system being used, the circumstances of use, or information being exchanged—can be used to determine whether there is a reliable indication that the same user sent both the ad hoc data and the SDV data. An example of ad hoc data could be personal information; images, audio, video, or other media to be stored in connection with the user's virtual presence or published; or other settings or controls input to the PVR server.

At or around t2, the Data Module 380 begins parsing the incoming data. In this example, the data is parsed by variable received and time (t). The Data Module tabulates, plots, or otherwise stores the data in a manner that it can be analyzed for anomalies. As shown at t8, a user-exception anomaly is detected. In response, the PVR server disregards SDV values, and any query, received after t8 (and indicated by the x markings in circles). In one embodiment, the PVR server operates in at least two states: an authentication state during the period that the user has been authenticated without a user-exception anomaly having occurred and an authentication-pending state during the period following detection of a user-exception anomaly and before the user has been reauthenticated (e.g., as describe above). In this instance, beginning at t8, the PVR server operates in the authentication-pending state. The PVR server operates in the authentication-pending state until the user reauthenticates themself by sending, or causing to be sent, SSV data at t11.

Prior to the user-exception anomaly (between t0 and t7), the user enters into a transaction with third-parties TP1, TP2, and TP3. As shown in this example, TP1 could be a merchant, TP2 could be a certification authority (for either the user or the merchant or both), and TP3 could be a bank. If TP1 is a physical merchant, it may perceive some SDV data about the user such as, for example, a temperature check, facial image, physical location, description of clothes or other personal description of the individual user, or any other data that the merchant might perceive or determine about the user. The merchant then sends the SDV data it collected to the PVR server (at t0). Alternatively, if TP1 were an online merchant, the SDV data could be, for example, a mac address of the user's communication device, credit card number, IP address, or other information the merchant might perceive or determine about the user, the user's location, or the user's habits. For, example, TP1 may query the PVR server to inquiry as to whether the user regularly purchases a certain class of goods for delivery to a specific location. The certification authority (TP2) also receives or determines data related to one or more of the user, TP1, and TP3. The certification authority then sends the SDV data it collected to the PVR server (at t1). Finally, the bank (TP3) also receives or determines SDV data related to one or more of the user, merchant, or certification authority. The bank then sends that SDV data to the PVR server (at t2).

The analysis module 360 compares the SDV data received from the third-parties to known SDV values or patterns that the PVR server independently received from the user (or, in the case of patterns, determined), which data is stored in the Data Module 380. The analysis module analyzes the SDV data received from TP1 and determines a score, which score is based upon how closely the stored data matches the data received from each such third-party. For example, the Data Module could analyze the SDV data received from TP2 and provide a binary result, which result is based upon whether the data matches to a minimum threshold or not. The threshold could be, for example, the score determined when comparing data from TP1 to known SDV values. The Data Module could analyze SDV data received from TP3 on identical (or other grounds) to determine if there is a sufficient match. The Boolean operator then conducts a comparative analysis of the SDV data received from TP1, TP2, and TP3. In one embodiment, the Boolean operator receives data demonstrating whether a sufficient match has been made for each set of data received from the third-parties. For example, the Boolean module might detect whether a sufficient match was returned from each of TP1, TP2, and TP3 and return a binary result corresponding to whether all matches were sufficient or whether less than all were sufficient. If all matches were sufficient to meet established criteria, the analysis module, or other component of the PVR server, could send authorization to the bank (TP3) to send, or allow to be sent, payment to the merchant (TP1).

As further shown in FIG. 3, at t8, an unknown querying party (UP) queries the PVR server for information about the user. The PVR server does not respond during the period between t8 (when the user-exception anomaly was detected) and before t11 (when SSV data is received to reauthenticate the user). The analysis module processes the request and determines, based upon user settings stored in the settings memory device 362, whether, when, or what information to provide to the UP in response to the query. At t12, the PVR server responds to the UP. In this manner, the PVR server can serve as—for lack of a better term—a social media or other online presence of the user or other publisher of information about the user.

The data is always protected and under the user's control. It is secured (e.g., by the data protection wall 162 shown in FIG. 1). The user's settings control whether, when, or how the PVR server responds to queries. For example, the settings may allow an increased level of personal information to be provided to family or friends (e.g., as confirmed, possibly, by a certification authority), or individuals in the same general location as the user (e.g., based upon those user's GPS data). As another example, based upon the user settings, the PVR server may only respond to queries from any user, requester, or other third-party (or group or type of the foregoing) that occur below a certain frequency or total amount (e.g., as determined by a load balancer or other threat monitoring software); such as to prevent fishing or spam attempts or breach threats. As another example, the settings can be adapted as needed. For example, the user could set the PVR server to only answer inquiries from vehicle dealers on a specific given date when the user will be out shopping for vehicles. As another example, the settings may allow a user to control the strength of a match required for a transaction to go through—such as, for example, requiring a lower level of match for retail transactions and a higher level of match for major purchases. As another example, the settings may allow a user to decide what people see about the user or the user profile (e.g., the user's face, owned NFTs, location, and so on). The settings may allow a user to determine under what circumstances such information is viewable (e.g., whether the querying party is logged in, whether the querying party is subject to a verified and accepted connection, the physical proximity of the querying party to a device location or other location, and so on). As another example, the PVR server may maintain certain SDV values or ad hoc data for only limited time periods or cease providing certain of such data after certain time periods. In one embodiment, the PVR system or device is configured so the user's information is protected or so temporal or transient information (e.g., emotional writings or posts) is not available in perpetuity unless the user specifically desires otherwise. It will be understood that the foregoing are only limited examples of the metrics by which a user might control access to their profile or the PVR server's response to queries.

The PVR system or device allows the user to have full control over their profile, as opposed to, for example, other centralized platforms provided by a third-parties. For example, a journalist or prominent individual who publishes content often does so via third-party channels (e.g., Twitter, Instagram, Facebook), which (1) such person cannot always control (e.g., modifying or removing content at any time) or (2) can be hacked. One embodiment of the PVR system or device would allow such individuals to maintain full control of all content they wish to publish by using the PVR server to publish the content or otherwise communicate the content to other parties (e.g., via an application programming interface) and allow such individual the peace of mind to know that the PVR server can be set to resist any new content—or to be quarantined or frozen—if a user-exception anomaly is detected.

Additionally, the SDV values received from the user can serve as a sort of identity heartbeat so that the PVR server can detect a would-be hacker immediately and protect the user and the user's virtual presence from erroneous data received from would-be hackers or from being disclosed or used by them. In one embodiment, the SDV sensor is configured to automatically take samples of the user (see, "auto" in FIG. 3) and to provide regular transmissions of values (e.g., throughout the day) to the PVR server. In such embodiment, the SDV data stream provided to the PVR server would preferably be of the type or nature that it would difficult or impossible for an individual (e.g., a malicious third-party) to replicate on the part of the user.

Figure 4:
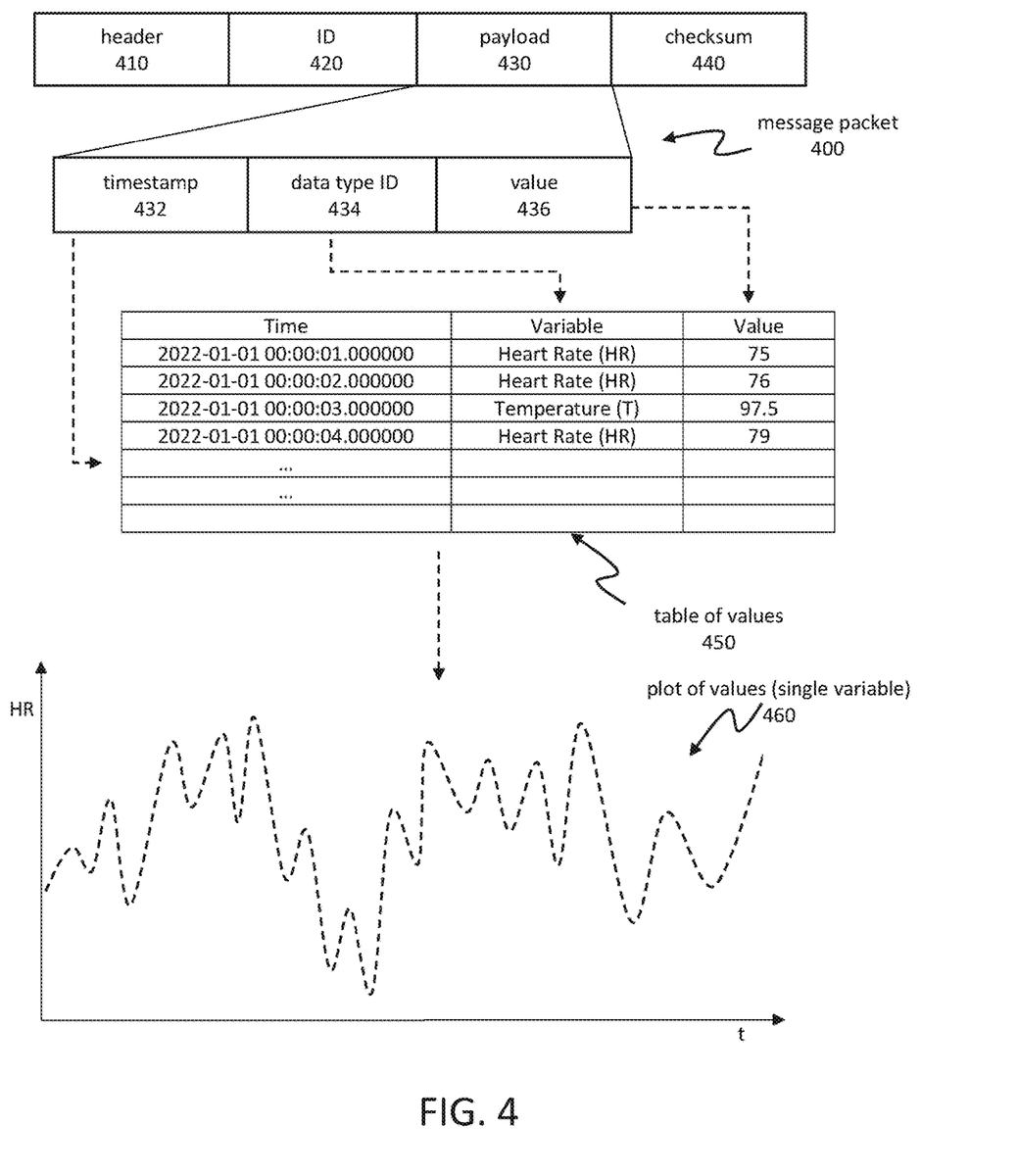
FIG. 4 illustrates an example of how data is received and stored by the PVR server.

FIG. 4 illustrates an example of how data is received and stored by the PVR server. In one embodiment, the PVR server receives data in the form of a message packet 400. The message packet can contain a header 410, ID (or identification portion) 420, payload 430, and checksum 440. In this embodiment, the header can include information identifying the beginning of the message, the time the message packet was created (or sent), and the number of bits included in the message; the ID can identify each individual message packet; the payload can contain some or all of the data (e.g., SSV value, SDV value, ad hoc information, queries from third-parties, etc.); and the checksum can be used to check for errors in transmission, as is known in the art. Those of skill in the art will understand that the format of message packets can be arranged in many ways, with the contents changed or rearranged. They will also understand that this is only one example of how electronic communications can be accomplished.

As shown in the example in FIG. 4, the Payload 430 contains a timestamp 432, data type ID 434, and value 436. It may also include information related to formatting a value, including, but not limited to, identifying units and number of decimals points. The timestamp could include information identifying when a given sample was taken. The data type ID could identify the type of data contained in the message, such as, for example, a description or identifier of the SSV or SDV to which the value 436 corresponds. The value could contain information related to a sample gathered from a sensor. Alternatively, the data type ID could identify the type of ad hoc data or query received, and the value contains the contents of such ad hoc data or query.

As can be seen in the table of values 450 of FIG. 4, the PVR server can store the information in a tabulated fashion. It will be understood that any other method of organizing data can be used, such as, for example, a database, lookup table, tagged values, or other method of logically arranging data. Such logical arrangement of data allows for the data to be parsed and analyzed. The PVR server can parse the Heart Rate (HR) data separately (not shown). As shown in the plot of values (single variable) 460, the PVR server can create a historical plot of received Heart Rate (HR) data over time (t) by using the information contained in the payload 430 of the message packet 400. These functions of parsing, storing, and plotting data can be used to perform the data analysis processes to detect anomalies.

Figure 5:
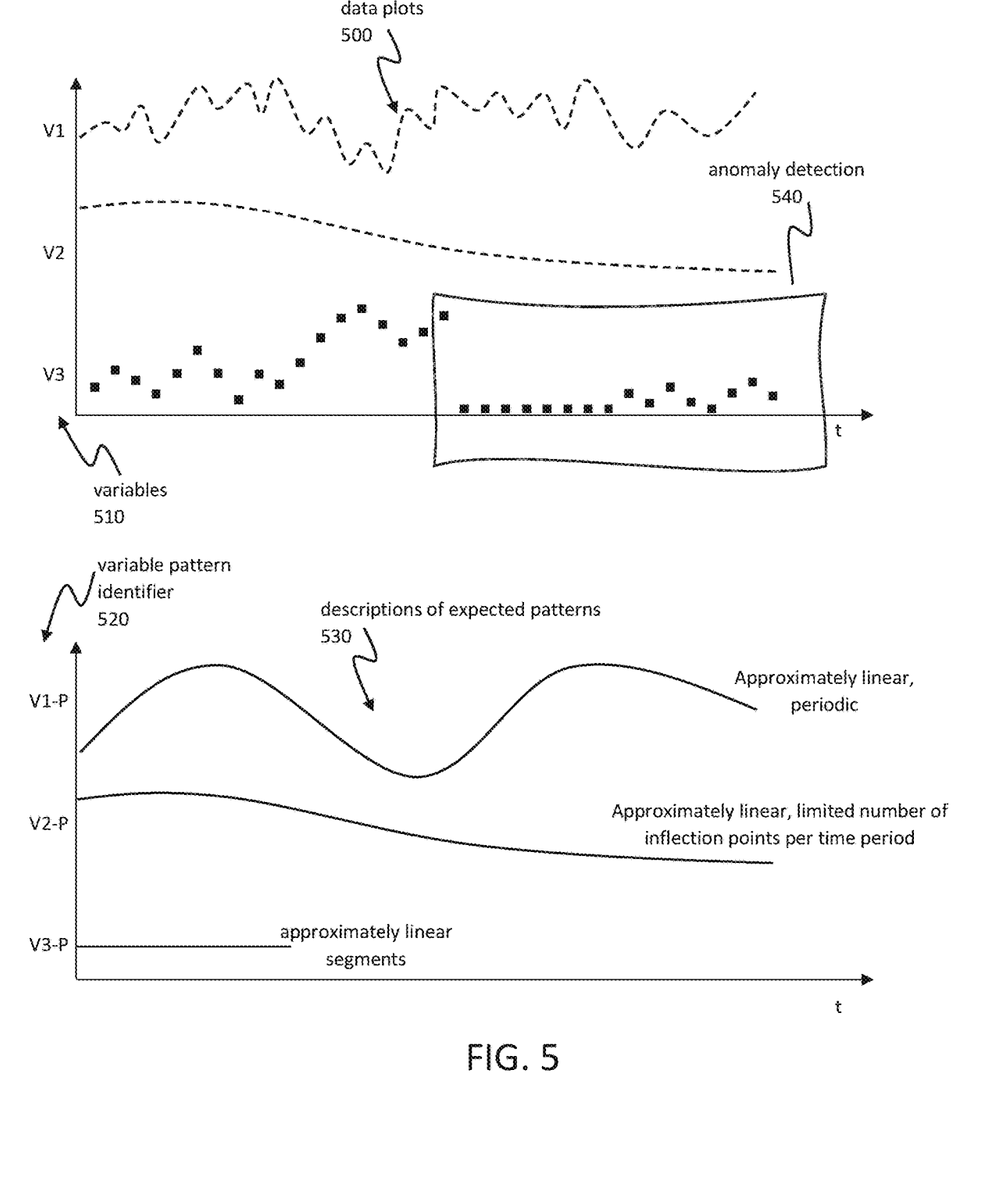
FIG. 5 provides a simple, demonstrative representation of how anomaly detection can be accomplished.

FIG. 5 provides a simple, demonstrative representation of how anomaly detection can be accomplished. It will be understood, however, that many methods exist for anomaly detection, which vary widely in terms of sophistication and complexity.

Some examples of anomaly detection means include pattern matching, curve fit, or other analyses to determine whether a discontinuity or other unlikely change in data occurred. Machine learning or other evolving logic network may be used. Other methods include, for example, histograms, fitted line plots, regression analyses, z-scores, chi-square values, p-values, interquartile ranges, hypothesis tests, probability theory, or error calculation. Numerous methods are set out in publicly available papers, and have been for a long time. One example of a known method of detecting anomalies in data streams includes analysis of multivariable data streams. See, for example: Peter J. Rousseeuw & Bert C. van Zomeren (1990) Unmasking Multivariate Outliers and Leverage Points, Journal of the American Statistical Association, 85:411, 633-639, DOI: 10.1080/01621459.1990.10474920; E. Eskin A. Degirmenci and O. Karal, Robust Incremental Outlier Detection Approach Based on a New Metric in Data Streams, in IEEE Access, vol. 9, pp. 160347-160360, 2021, doi: 10.1109/AC-CESS.2021.3131402; Robert J. Bullen, Dan Cornford, Ian T. Nabney, Outlier detection in scatterometer data: neural network approaches, Neural Networks, Volume 16, Issues 3-4, 2003, Pages 419-426, ISSN 0893-6080, https://doi.org/10.1016/S0893-6080(03)00013-3; Hodge, V., Austin, J. A Survey of Outlier Detection Methodologies. Artificial Intelligence Review 22, 85-126 (2004), https://doi.org/10.1023/B:AIRE.0000045502.10941.a9; Saima Afzal, Ayesha Afzal, Muhammad Amin, Sehar Saleem, Nouman Ali, Muhammad Sajid, "A Novel Approach for Outlier Detection in Multivariate Data", Mathematical Problems in Engineering, vol. 2021, Article ID 1899225, 12 pages, 2021, https://doi.org/10.1155/2021/1899225; see also, e.g., citations and references included in any of the foregoing.

In one embodiment, the PVR system distinguishes between a user-exception anomaly and a non-user-exception anomaly. Non-user-exception anomalies include, for example, transmission errors, changes in patterns of variables in expected or predicted ways (e.g., based upon user input or other user information), point errors or anomalies, errors or anomalies in single measurements, errors or anomalies in a limited set of packets of data containing outliers, or due to the SDV sensor being interrupted, powered off, or temporarily disconnected from a remote or local network. In another embodiment, the PVR system operates in a training period in which the PVR system receives inputs from the SDV sensor over time to determine expected patterns. In another embodiment, the SDV sensor is configured to determine whether an interruption or point error occurred by, for example, requesting a historical set of data from the SDV sensor and comparing it to the historical data on the SDV server. For example, when the PVR server detects a point outlier or cluster of outliers, it can be configured to disregard those results, receive a few more data points from one of the sensors, and then test for an anomaly. If an error results from a communication loss or network interruption, the PVR server can request a cache of historical data from the sensor, which the sensor sampled during the period of data loss, and test for anomalous conditions. In another embodiment, the SDV sensor is configured to analyze a data stream over time—or to run anomaly detection over independent variable values collected at the same time or near in time—to determine the probability that, or the extent to which, some or all of such independent variable values might be anomalous. For example, if the SDV sensor measures 3 independent variables, an anomaly is only detected in one variable value over a limited time period, and the other variable values remain anomaly-free over a period similar or overlapping periods of time, the PVR server may determine that a simple point error or interrupt occurred. In another embodiment, the SDV sensor sends a signal, or includes an indication along with transmission of an SDV value, indicating that power has been shut down. The server may also identify or track periods when either the server or a sensor has been, or is expected to be, offline. In one example, the SDV sensor provides an indication along with transmitted data when, for example, a remote network becomes unavailable. It will be understood that such methods could also apply to the SSV sensor and SSV values. In any of these ways, or other ways known in the art, alone or in combination, the PVR device or system identifies such limited errors or interruptions not to be user-exception anomalies.

A user-exception anomaly may be detected when, for example, a pattern of one or more SDV values indicates not only an anomaly, but a pattern indicating that a user other than the authenticated user has been interacting with an SDV sensor. As one example, if the SDV values for heart rate and location were to jump erratically (e.g., back and forth from 50 beats per minute ("BPM") to 170 BPM) and location were to jump erratically (e.g., back and forth from a location in North America to a location on another continent); the PVR server might determine that an anomaly existed but not necessarily a user-exception anomaly. The reason being that the data would not correspond to the expected values of any human user. Conversely, for example, if the heart rate (or rhythm) pattern were to change from a stable resting BPM of 45 to a stable resting BPM of 65 in one day, and location were to change from a somewhat continuous location in Chicago to a somewhat continuous location in New York, the PVR server might determine that a user-exception anomaly occurred. The PVR server would preferably apply different authentication methods to each, such as, for example, a more reliable or multifactorial authentication method in the case of a user-exception anomaly. It would also preferably disregard any new data immediately upon detecting a user-exception anomaly. In other embodiments, the possibility of a user-exception anomaly (or similar type of anomaly) may occur when the original user notifies the system that the user has misplaced a sensor or when a geofencing feature indicates the sensor has moved unexpectedly.

In the example of FIG. 5, three different variables (V) 510 are plotted against time (t) in data plots 500. It will be understood that any number of variables could be plotted (or tabulated or logically stored, as set forth above) on any number of plots (or in any number of tables or sets of logically arranged data). The example of FIG. 5 is provided as a simple, demonstrative example. FIG. 5 also shows a simple example of stored information related to variable pattern identifiers 520, which identify or correspond to the descriptions of expected patterns 530 ("Descriptions"). The Descriptions relate to, or describe, expectations or expected patterns based upon the type of variable, historical values of the variable, machine learning, or any other method of predicting or forming expected patterns. For example, the Description for V1 (V1-P) is linear and periodic. In this case example, V1 could be heart rate. Depending upon a user's activity level, the range of heart rate values may change over time but, generally, heart rate values change in roughly linear fashion, as opposed to, for example, jumping by 50 beats per minute between two measurements—assuming such measurements are recorded in approximate real time. Other pattern matching methods could also be used. For example, the resting heartrate (e.g., the minimum heartrate of an individual under resting conditions) does not tend to change quickly or drastically. If a sensed resting heartrate were to sink materially below a level measured in the past, say, year or so, the system may trigger an alert or require reauthentication using the SSV. These are just examples, as many methods are known for detecting anomalous patterns in heart rate; such as, for example, in detecting atrial fibrillation or other cardiac events, which could be applied, with appropriate modifications, to this context.

The above determination or calculation of expected variable patterns can be made based upon an a priori assumption, or the patterns can be determined once a sufficient set of historical values have been obtained to create one.

In the example shown in FIG. 5, V1-P is linear and periodic. V2-P is also linear, but contains a limited number of inflection points (shown as having approximately 2). Thus, V2 could represent blood glucose levels. Generally, there is a rise in the amount of glucose in an individual's blood after feeding and then a gradual decrease. Another example might be core body temperature, which generally decreases over the day and throughout the nighttime, but heats back up when an individual wakes in the morning. V3-P describes linear segments. In this example, there is no limit on the number or orientation of linear segments, but the pattern simply describes each segment as being roughly continuous. Thus, V3 could represent, for example, user location (such as a concatenation or other combination of GPS coordinates). Alternatively, each of three variables (V4, V5, and V6)) could contain one component of a GPS coordinate set, and V3 could be the change in distance between each subsequent measurement. Because a given individual's location generally changes in approximately linear fashion, as opposed to, for example, jumping rapidly between long distances; detecting a user-exception anomaly in the event a remote user hacks were to attempt to hack the data stream—or input data to the PVR server from a cloned sensor—would be possible.

Finally, FIG. 5 shows a visual depiction of data that might lead to detection of an anomaly. As shown in the plot of V3 in the data plots 500, there is a sudden drop in the value of V3 (at the left side of the anomaly detection 540 box). Additionally, the value of V3 remains unusually low and consistent over time thereafter. These events—either alone, or especially in combination—could lead to a determination that such values are anomalous. The PVR server may also look to the pattern of data once it begins changing again (e.g., near the middle-right of the anomaly detection box). Thus, for example, the PVR server may determine that even though the data is changing relatively expectedly, the fact that the average or median value over time has changed significantly indicates that a user-exception anomaly occurred—such as, for example, a malicious third-party either having corrupted the SDV data stream or appropriated the SDV sensor. By contrast, if the data in the anomaly detection box were to appear to be noise, the PVR server may analyze the data, or check other metrics, to determine whether an anomaly occurred or a user-exception anomaly occurred.

Based upon the above discussion, additional examples of uses and arrangements of the PVR device or system can be described. One specific example is described here for illustrative purposes. The system might use a physical sensor to measure a user's retinal pattern as an SSV to authenticate the user as the owner of a virtual presence, which is stored on the secured PVR server. The PVR server could then populate the SDV database with SDVs, which could include, by way of example, heartrate samples throughout the day, physical temperature, global positioning location, social media posts made by the user, physical appearance (e.g., dress), or any other type of data such as vital signs, behavior, or input from sensors. In such exemplary embodiment, the PVR server could monitor historical SDV values for inconsistencies or outlier results. Thus, for example, if the global positioning location were to change from one state to another without a somewhat linear progression over time, the system might provide an alert. As an option, if the individual were to fly on an airplane where communication with the server is not possible, the SDV values could be quarantined in a separate buffer, provided to the PVR server upon landing, and then used to clear the alert. Alternatively, such a non-linear change in position could prompt the PVR server to require reauthentication by use of the SSV. If the extent of the anomaly was determined to be extreme (or long lasting), the PVR server could require additional user authentication methods, including, for example, video communication with the physical individual to witness the user use of the retinal sensor (or other SSV sensor). As one example, an SSV value could be provided via a physical device that conducts a retinal scan and sends the retinal data, along with an encrypted version of the device mac address, to the PVR server. In such instance, an alert (triggered in response to an anomaly) could only be cleared by a result that substantially matches prior retinal scan results. Optionally, if the foregoing SSV confirmation were to fail—for any reason, such as, for example, the user has lost their SSV device—a next level of authentication could be used. Any number of options could be used for increasing the authentication levels to correspond to the appropriate level of reliability. Given that one would expect such instances to be rare, it would not be unduly disruptive to occasionally require an extensive authentication process, such as, for example, requiring provision of a number of SSV values or that the user answer questions about the user that a stranger could not.

The invention claimed is:
1. An authentication device that uses physical information associated with an individual user, obtained from a mobile sensor affixed to the user, to create, modify, or secure an electronic identity or other virtual presence of the user and that is configured to:
- (a) communicate, either directly or indirectly, with a first sensor that is configured to sense a substantially static user variable;
- (b) communicate, either directly or indirectly and over at least one remote network, with a second sensor that is a mobile sensor, that is configured to be affixed to a user, and that is configured to sense a substantially dynamic user variable associated with the user;
- (c) receive, either directly or indirectly, from the first sensor one or more substantially static user variable values;
- (d) use the one or more substantially static user variable values to authenticate the user;
- (e) receive, either directly or indirectly and over at least one remote network, from the second sensor two or more substantially dynamic user variable values;
- (f) store the one or more substantially static user variable values and the two or more of the substantially dynamic user variable values in memory;
- (g) analyze one or more substantially dynamic user variable values to detect an anomaly, wherein the anomaly is a pattern, outlier, or other deviation that differs from a normal or expected pattern, value, or other change in one or more of the one or more substantially dynamic user variables associated with the user indicating that the second sensor stopped sensing a substantially dynamic user variable associated with the user; and
- (h) if one or more of the substantially dynamic user variable values, either alone or in combination, is determined to be an anomaly, initiate a user authentication process using the first sensor to authenticate the user, wherein the two or more substantially dynamic user variables serve as a substantially regular or continuous, and substantially real-time, indication that the authenticated user is communicating with the server.

2. The server of claim 1, wherein the server controls transmission of information related to substantially dynamic user variable values over a network based upon both (i) whether one or more substantially dynamic user variable values, either alone or in combination, is determined to be an anomaly and (ii) when such anomaly was detected in relation to at least one user authentication process.

3. The server of claim 1, wherein the server is further configured to operate in an authentication-pending state when the user is not authenticated; to disregard one or more substantially dynamic user variable values when in the authentication-pending state; to receive one or more substantially static user variable values from the first sensor when in the authentication-pending state; to authenticate the user using the one or more substantially static user variable values; to cease operating in the authentication-pending state; and to not disregard one or more substantially dynamic user variable values after the server has ceased operating in the authentication-pending state.

4. The server of claim 1, wherein the server is configured to receive substantially dynamic user variable values in the form of a data stream and wherein the data stream, when actively transmitted, includes data transmitted at a substantially regular or continuous rate of at least one value per hour.

5. The server of claim 1, wherein the server is configured to cause the second sensor to adjust the transmission rate of substantively dynamic user variable values based upon the transmission rate of substantially static user variable values.

6. The server of claim 1, wherein the server is further configured to determine whether an anomaly is a user-exception anomaly.

7. The server of claim 1, wherein the server is further configured to store a user profile of the user and to modify the user profile based upon information received from the user if two conditions are met: (a) the server receives the information at approximately the same time as the server receives one or more substantially dynamic user variable values and (b) the one or more substantially dynamic user values the server receives at approximately the same time as the server receives the information are determined not to contain an anomaly.

8. The server of claim 1, wherein the server is configured to publish information related to the user using an online platform.

9. The server of claim 1, wherein the server is further configured to store a user profile of the user; to receive information related to one or more settings for controlling the transmission of information contained in the user profile over at least one remote network; to receive a request for information related to the user profile from at least one person over at least one remote network, wherein the person is not the user; to determine, based upon the settings, whether to transmit information related to the user profile in response to the request; and to transmit information related to the user profile in response to the request.

10. The server of claim 9, wherein the server is further configured to receive information from at least two persons over at least one remote network, wherein neither of the persons is the user; and to transmit information related to the user to at least one of the persons based upon an analysis of the information received from the at least two persons.

11. The server of claim 10, wherein the server is further configured to compare the information received from at least one of the persons to one or more of the dynamic user variable values to determine how closely the information received from at least one of the persons matches the one or more dynamic user variable values; to determine, based upon the result of the comparison, whether to transmit information related to the match determination to at least one of the persons; and to transmit information related to the match determination to at least one of the persons.

12. An authentication system that uses physical information associated with an individual user, obtained from a mobile sensor affixed to the user, to create, modify, or secure an electronic identity or other virtual presence of the user comprising:
- a first sensor configured to sense a substantially static user variable;
- a second sensor that is a mobile sensor, that is configured to be affixed to a user, and that is configured to sense a substantially dynamic user variable associated with the user; and
- at least one server or cloud computing device, configured to:
  - (a) communicate with the first sensor, either directly or indirectly;
  - (b) communicate with the second sensor, either directly or indirectly and over at least one remote network;
  - (c) receive, either directly or indirectly, from the first sensor one or more substantially static user variable values;
  - (d) use the one or more substantially static user variable values to authenticate the user;

(e) receive, either directly or indirectly and over at least one remote network, from the second sensor two or more substantially dynamic user variable values;
(f) store the one or more substantially static user variable values and the two or more of the substantially dynamic user variable values in memory;
(g) analyze one or more substantially dynamic user variable values to detect an anomaly, wherein the anomaly is a pattern, outlier, or other deviation that differs from a normal or expected pattern, value, or other change in one or more of the one or more substantially dynamic user variables associated with the user indicating that the second sensor stopped sensing a substantially dynamic user variable associated with the user; and
(h) if one or more of the substantially dynamic user variable values, either alone or in combination, is determined to be an anomaly, initiate a user authentication process using the first sensor to authenticate the user;
wherein the two or more substantially dynamic user variables serve as a substantially regular or continuous, and substantially real-time, indication that the authenticated user is communicating with the server.

13. A method of using physical information associated with an individual user, obtained from a mobile sensor affied to the user, to create, modify, or secure an electronic identity or other virtual presence of the user by receiving and analyzing values received from the mobile sensor and at least one other sensor, comprising the steps of:
(a) communicating, either directly or indirectly, with a first sensor that is configured to sense a substantially static user variable;
(b) communicating, either directly or indirectly and over at least one remote network, with a second sensor that is a mobile sensor, that is configured to be affixed to a user, and that is configured to sense a substantially dynamic user variable associated with the user;
(c) receiving, either directly or indirectly, from the first sensor one or more substantially static user variable values;
(d) using the one or more substantially static user variable values to authenticate the user;
(e) receiving, either directly or indirectly and over at least one remote network, from the second sensor two or more substantially dynamic user variable values;
(f) storing the one or more substantially static user variable values and the two or more of the substantially dynamic user variable values in memory;
(g) analyzing one or more substantially dynamic user variable values to detect an anomaly, wherein the anomaly is a pattern, outlier, or other deviation that differs from a normal or expected pattern, value, or other change in one or more of the one or more substantially dynamic user variables associated with the user indicating that the second sensor stopped sensing a substantially dynamic user variable associated with the user; and
(h) determining if one or more of the substantially dynamic user variable values, either alone or in combination, is an anomaly and, if so, initiating a user authentication process using the first sensor to authenticate the user;
wherein the two or more substantially dynamic user variables serve as a substantially regular or continuous, and substantially real-time, indication that the authenticated user is communicating with the server.

14. The method of claim 13, further including the step of controlling transmission of information related to substantially dynamic user variable values over a network based upon both (i) whether one or more substantially dynamic user variable values, either alone or in combination, is determined to be an anomaly and (ii) when such anomaly was detected in relation to at least one user authentication process.

15. The method of claim 13, further including the steps of disregarding one or more substantially dynamic user variable values during a period after a user-exception anomaly occurred and prior to the user being authenticated; and ceasing to disregard one or more substantially dynamic user variable values during a period after the user has been authenticated but before a user-exception anomaly has occurred.

16. The method of claim 13, further including the step of receiving dynamic user variable values in the form of a data stream, wherein the data stream, when actively transmitted, includes data transmitted at a substantially regular or continuous rate of at least one value per hour.

17. The method of claim 13, further including the step of causing the transmission rate of substantially dynamic user variable values to be adjusted based upon the transmission rate of substantially static user variable values.

18. The method of claim 13, further including the step of determining whether an anomaly is a user-exception anomaly.

19. The method of claim 13, further including the steps of storing a user profile of the user and modifying the user profile based upon information received from the user if two conditions are met: (a) information that is not a substantially dynamic user variable value is received at approximately the same time as one or more substantially dynamic user variable values and (b) one or more substantially dynamic user values received at approximately the same time as the information do not contain an anomaly.

20. The method of claim 13, further including the step of publishing information related to the user using an online platform.

21. The method of claim 13, further including the steps of storing a user profile of the user; receiving information related to one or more settings for controlling the transmission of information contained in the user profile over at least one remote network; receiving a request for information related to the user profile from at least one person over at least one remote network, wherein the person is not the user; determining, based upon the settings, whether to transmit information related to the user profile in response to the request; and transmitting information related to the user profile in response to the request.

22. The method of claim 21, further including the steps of receiving information from at least two persons over at least one remote network, wherein neither of the persons is the user; and transmitting information related to the user to at least one of the persons based upon an analysis of the information received from the at least two persons.

23. The method of claim 22, further including the steps of comparing the information received from at least one of the persons to one or more of the dynamic user variable values to determine how closely the information received from at least one of the persons matches the one or more dynamic user variable values; determining, based upon the result of the comparison, whether to transmit information related to the match determination to at least one of the persons; and transmitting information related to the match determination to at least one of the persons.

* * * * *